United States Patent [19]
Sakaue

[11] Patent Number: 5,083,000
[45] Date of Patent: Jan. 21, 1992

[54] WIRE CUT TYPE ELECTRIC DISCHARGE MACHINING METHOD AND APPARATUS

[75] Inventor: Makoto Sakaue, Aichi, Japan

[73] Assignee: Mitsubishi Denki K.K., Tokyo, Japan

[21] Appl. No.: 540,238

[22] Filed: Jun. 19, 1990

[30] Foreign Application Priority Data

Sep. 5, 1989 [JP] Japan .................................. 1-229645

[51] Int. Cl.⁵ .......................... B23H 7/06; B23H 7/20
[52] U.S. Cl. ........................... 219/69.12; 364/474.04
[58] Field of Search ................ 219/69.12, 69.13, 69.17; 364/474.04

[56] References Cited

FOREIGN PATENT DOCUMENTS

| 62-9826 | 1/1987 | Japan . | |
|---|---|---|---|
| 62-208829 | 9/1987 | Japan | 219/69.12 |
| 1-188232 | 7/1989 | Japan | 219/69.13 |
| 1-210221 | 8/1989 | Japan | 219/69.12 |

*Primary Examiner*—Geoffrey S. Evans
*Attorney, Agent, or Firm*—Sughrue, Mion, Zinn, Macpeak & Seas

[57] ABSTRACT

A wire cut type electric discharge machining method and apparatus, in which, when a fault occurs during a configuration machining operation, the configuration machining operation is suspended and skipped over to the next configuration machining operation, the method comprises: a step of storing machining start position data of the configuration machining operation with which the fault has occurred; a step of determining whether or not a machining operation is a finish machining operation; a step of collating, when the determination results in a finish machining operation, the machining start position data thus stored with machining start position data in the finish machining operation; and a step of carrying out the finish machining operation when the collation results in non-coincidence, and skipping the finish machining operation over to the following finish machining operation when the collation results in coincidence.

2 Claims, 7 Drawing Sheets

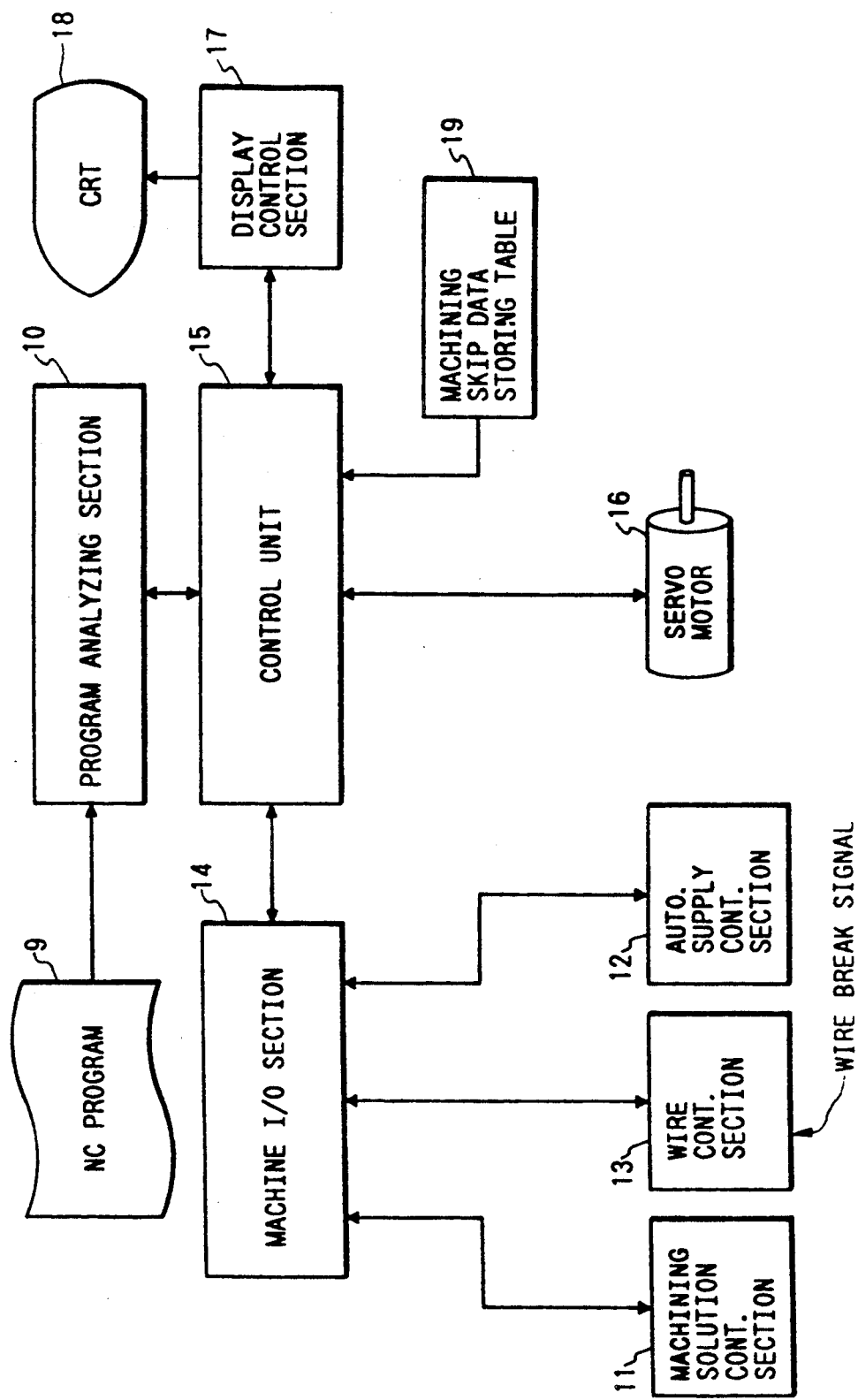

WIRE CUT TYPE ELECTRIC DISCHARGE MACHINING METHOD AND APPARATUS

FIELD OF THE INVENTION

This invention relates to a wire cut type electric discharge machining method in which a machining accuracy is maintained unchanged in a finish machining operation following a rough machining operation, and an apparatus for practicing the method.

BACKGROUND OF THE INVENTION

FIG. 3 shows the arrangement of a conventional wire cut type electric discharge machine. In FIG. 3, reference numeral 1 designates a workpiece; 2, a movable table on which the workpiece 1 is mounted; 3, a wire cut type electric discharge machine body (hereinafter referred to merely as "a machine body 3", when applicable); 4, a wire electrode used for machining the workpiece 1; a machining solution supplying device for supplying a machining solution to a gap formed between the wire electrode 4 and the workpiece 1; 6, a numerical control device for performing a position control operation and a machining control operation in the machine body 3, an automatic wire-break return operation of the wire electrode 4, and so forth (hereinafter referred to as an NC device 6", when applicable); 7, an automatic wire electrode supplying device for automatically connecting or cutting the wire electrode 4; and 8, a machining power source device for supplying discharge current to the machining gap between the wire electrode 4 and the workpiece 1.

FIG. 4 is a block diagram showing the arrangement of the NC device in detail. In FIG. 4, reference numeral 9 designates an NC program for controlling the machine body 3; 10, a program analyzing section for analyzing the NC program 9; 11, a machining solution control section for controlling the machining solution supplying device 5 to supply the machining solution to the machining gap; 12, an automatic supply control section for controlling the automatic wire electrode supplying device 7 to automatically connect or cut the wire electrode 4; 13, a wire control section for controlling the feed of the wire electrode 4 or outputting a wire break signal; 14, machine input/output section for transmitting signals to or receiving signals from the machining solution controlling section 11, the automatic supply controlling section 12, and the wire controlling section 13; and 15, a control unit. The control unit 15 drives a servo motor 16 according to an output signal of the program analyzing section 10 to control the position of the movable table 1, and applies signals through the machine input/output section 14 to the machining solution control section 11, the automatic supply control section 12 and the wire control section 13 to control the supply of the machining solution, the feed of the wire electrode 4 and the machining operation. Furthermore, when the wire electrode 4 is broken, in response to the wire break signal from the wire control section 13, the control unit 15 performs controls to automatically return the wire electrode 4.

Further in FIG. 4, reference numeral 17 designates a display section for displaying data such as coordinates on a CRT (cathode ray tube) 18; and 19, a machining skip data storing table into which, when the present configuration machining operation is skipped over to the next configuration machining operation for instance because of the breakage of the lo wire electrode 4 during discharge machining, data on the machining start position of the configuration machining operation which has been suspended, namely, machining start hole coordinates or machining start hole number is stored through the control unit 15.

The above-described machining skip is controlled entirely by the control unit 15.

FIG. 5 is a diagram for a description of a finish machining operation. In FIG. 5, reference character (a) designates a rough machining path; (b), a finish machining path; (c), a machining start hole; and (d), a machining end hole.

FIG. 6 is a flow chart for a description of the finish machining operation.

FIG. 7 shows a case where a plurality of finish machining operations are given to workpiece.

FIG. 8 is a diagram showing the occurrence of a machining skip.

FIG. 9 is a flow chart for a description of the occurrence of a machining skip.

The operation of the electric discharge machine thus constructed will be described with reference to FIG. 7.

First, at the machining start hole (A), the automatic wire electrode supplying device 7 is operated to automatically connect the wire electrode 4. The workpiece 1 is not machined yet, and rough machining electrical conditions are set. A machining operation is carried out along the rough machining path (a) to the machining end point (B) with machining current supplied from the machining power source device 8.

At the machining end point (B), the automatic wire electrode supplying device 7 is operated to automatically cut the wire electrode 4. The wire electrode 4 is moved along a path (d) to the machining start hole (D) of the second rough machining path ($a_1$). At the machining start hole (D), similarly as in the above-described case, the wire electrode 4 is automatically connected. Under the rough machining electrical conditions, a machining operation is carried out along the rough machining path ($a_1$) to the machining end point (E).

Similarly, a machining operation is carried out along the next rough machining path ($a_2$). Thus, the three rough machining operations have been accomplished.

Thereafter, the wire electrode 4 is moved to the machining start hole A again, where it is automatically connected.

Now, a finish machining operation will be described with reference to a flow chart of FIG. 6.

First, for a finish machining operation, in Step 20 the electrical conditions are changed to finish machining conditions, the amount of offset of the wire electrode 4 with respect to the workpiece 1 is changed, and the number of times of finish machining, namely, looping frequency is set, for instance, to one (I).

In Step 21, machining configurations are read out.

According to the machining configurations thus read out, a finish machining operation is carried out from the machining start hole (A) to the machining end point (G) in the same process as in the above-described rough machining operation; that is, the finish machining operation is carried out along the rough machining paths (a), ($a_1$) and ($a_2$) in a manner as shown in FIG. 5. Thus, the finish machining operation has been achieved for the three machining configurations.

In the above-described finish machining process, the machining operation is carried out twice including the rough and finish machining operations. However, the number of times of machining should be determined according to the surface roughness which is to be given to the workpiece 1.

In the above-described machining operations, it is determined whether or not a machining operation is to be continued, as shown in FIG. 9. In Step 24, it is determined whether or not a configuration machining operation is carried out according to the NC program. When it is determined that the configuration machining operation is carried out according to the NC program, then Step 25 is effected. In Step 25, it is determined whether or not a fault occurs during machining such as the breakage of the wire electrode or the short-circuiting of the wire electrode 4 and the workpiece 1. If no such fault occurs, the machining operation is continued as indicated in Step 26. If such a fault occurs, then it is determined that it is impossible to continue the machining operation, as a result of which Step 27 is effected. In Step 27, data on the machining start position of the configuration machining operation which cannot be continued; i.e., machining skip data such as the machining start hole coordinates or machining start hole number are stored in the machining skip data storing table 19 shown in FIG. 4. Furthermore, the configuration machining operation is suspended, and then the movable table 2 is moved until the wire electrode 4 is moved to the machining start hole of the second configuration machining operation. Under this condition, the second configuration machining operation is carried out.

The machining skip data stored in the machining skip data storing table 19 are displayed on the CRT 18 so as to warn the operator attracting his attention.

The conventional wire cut type electric discharge machine thus constructed is disadvantageous in the following points: For instance, in the case where, when rough machining operations are carried out as shown in FIG. 7, a machining skip occurs with the workpiece 1 during the first rough machining operation and a finishing machining operation is performed to the workpiece 1, it is necessary for the operator to confirm the contents of the machining skip data storing table 19 which are displayed on the CRT 18, to suspend the first configuration machining operation and to shift the latter to the second configuration machining operation. If, without confirmation of the contents of the table, a finish machining operation has been given to the first configuration, then finish machining operations will be given to the remaining configurations which have not been rough-machined yet. In this case, the workpiece thus machine is low in configuration accuracy and not uniform in surface roughness.

SUMMARY OF THE INVENTION

An object of this invention is to provide a wire cut type electric discharge machine with which a finish machining operation automatically (without the aid of the operator) follows a rough machining operation, and the resultant product is high in configuration accuracy and uniform in surface roughness.

A wire cut type electric discharge machining method according to the present invention, in which, when a fault occurs during a configuration machining operation, the configuration machining operation is suspended and skipped over to the next configuration machining operation, the method comprises: a step of storing machining start position data of the configuration machining operation with which the fault has occurred; a step of determining whether or not a machining operation is a finish machining operation; a step of collating, when the determination results in a finish machining operation, the machining start position data thus stored with machining start position data in the finish machining operation; and a step of carrying out the finish machining operation when the collation results in non-coincidence, and skipping the finish machining operation over to the following finish machining operation when the collation results in coincidence.

Furthermore, a wire cut type electric discharge machine in which, when a fault occurs during a configuration machining operation, the configuration machining operation is suspended and skipped over to the next configuration machining operation, according to the invention, comprises: memory means for storing machining start position data of the configuration machining operation with which the fault has occurred; discriminating means for determining whether or not a finish machining operation is performed; collating means for collating the machining start position data thus stored with machining start position data of the finish machining operation when the determination results in a finish machining operation; and skip control means for carrying out the finish machining operation when the collation results in non- coincidence, and skipping the finish machining operation over to the following finish machining operation when the collation results in coincidence.

In the method of the invention, data on the machining start position of a configuration machining operation with which a fault has occurred are stored, and in a finish machining operation the machining start position data thus stored are collated with those on the machining start position of the finish machining operation, and when the collation results in non- coincidence, the finish machining operation is carried out, whereas when the collation results in coincidence, the finish machining operation is skipped over to the following finish machining operation so that the finishing of the machining configuration with which a fault has occurred is skipped.

In the apparatus of the invention, the skip control means operates according to the contents of the memory means collated by the collating means and the result of discrimination by the discriminating means, in such a manner that, when the discrimination results in non-coincidence, the finish machining operation is carried out, whereas when the discrimination results in coincidence, the finish machining operation is skipped over to the following finish machining operation so that the finishing of the machining configuration with which a fault has occurred is skipped.

BRIEF DESCRIPTION OF THE DRAWINGS

FIG. 4 is a block diagram showing the arrangement of a numerical control device in the conventional wire cut type electric discharge machine;

DETAILED DESCRIPTION OF PREFERRED EMBODIMENT

Figure 1:
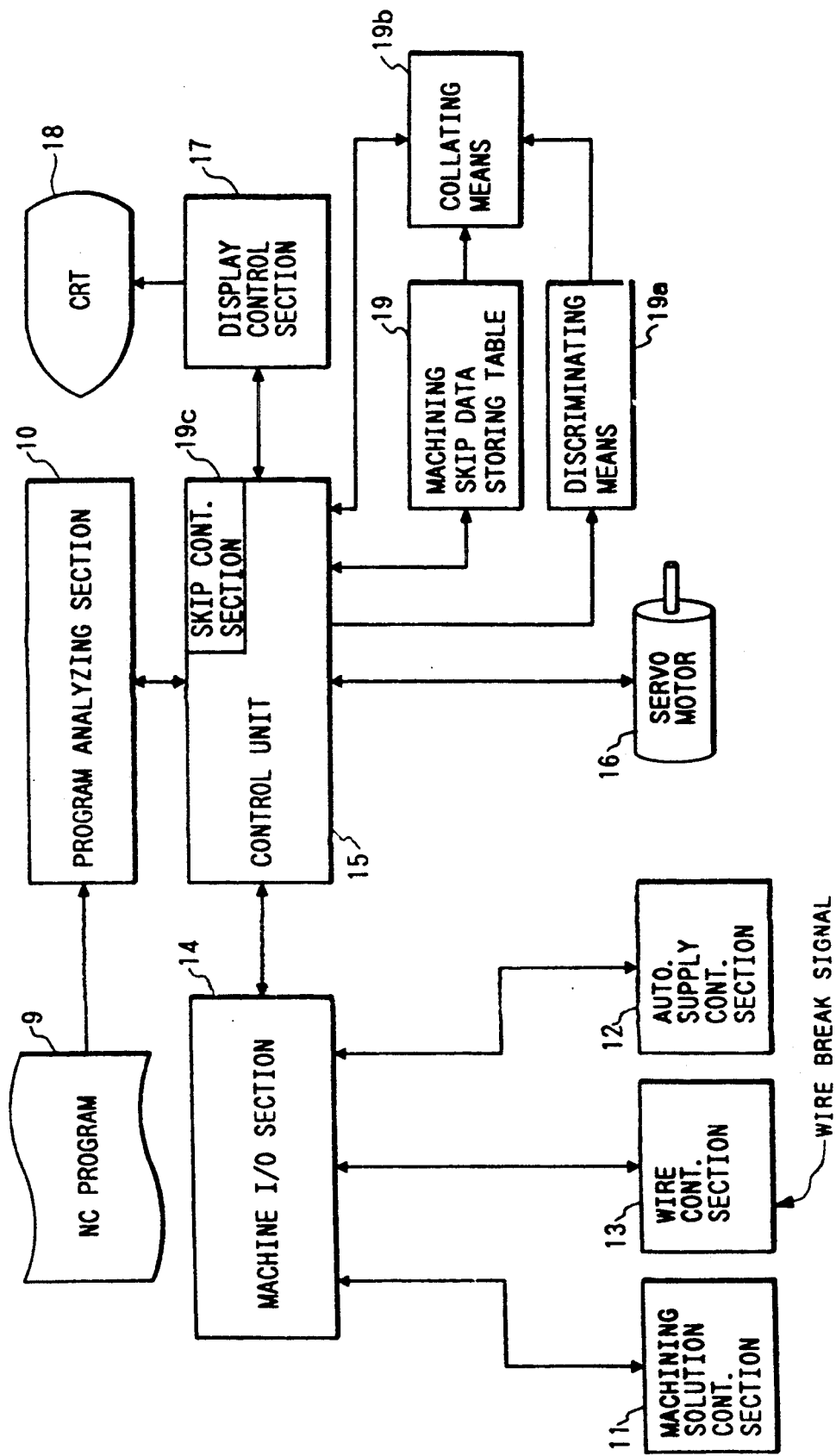
FIG. 1 is a block diagram showing the arrangement of an numerical control device in a wire cut type electric discharge machine which is one embodiment of this invention.

A wire cut type electric discharge machine, one embodiment of this invention will be described with reference to FIG. 1, in which components which have been described with reference to FIG. 4 are designated by the same reference numerals or characters.

Further in FIG. 1, reference character 19a designates discriminating means for determining whether or not a machining instruction is for a finish machining operation; 19b, collating means; and 19c, skip control means. When the discriminating means has determined that the machining instruction is for a coordinates of the machining start hole of a machining configuration of a rough machining operation with which a fault has occurred during the rough machining operation, that coordinates have been stored in the machining skip data storing table 19, with coordinates of the machining start hole of a machining configuration of a finish machining operation to be carried out. When the collation by the collating means 19b results in non-coincidence, the skip control means 19c allows the machine to perform the finish machining operation. When the collation results in coincidence, the skip control means 19c operates to switch the finish machining operation over to the next finish machining operation.

Figure 2:
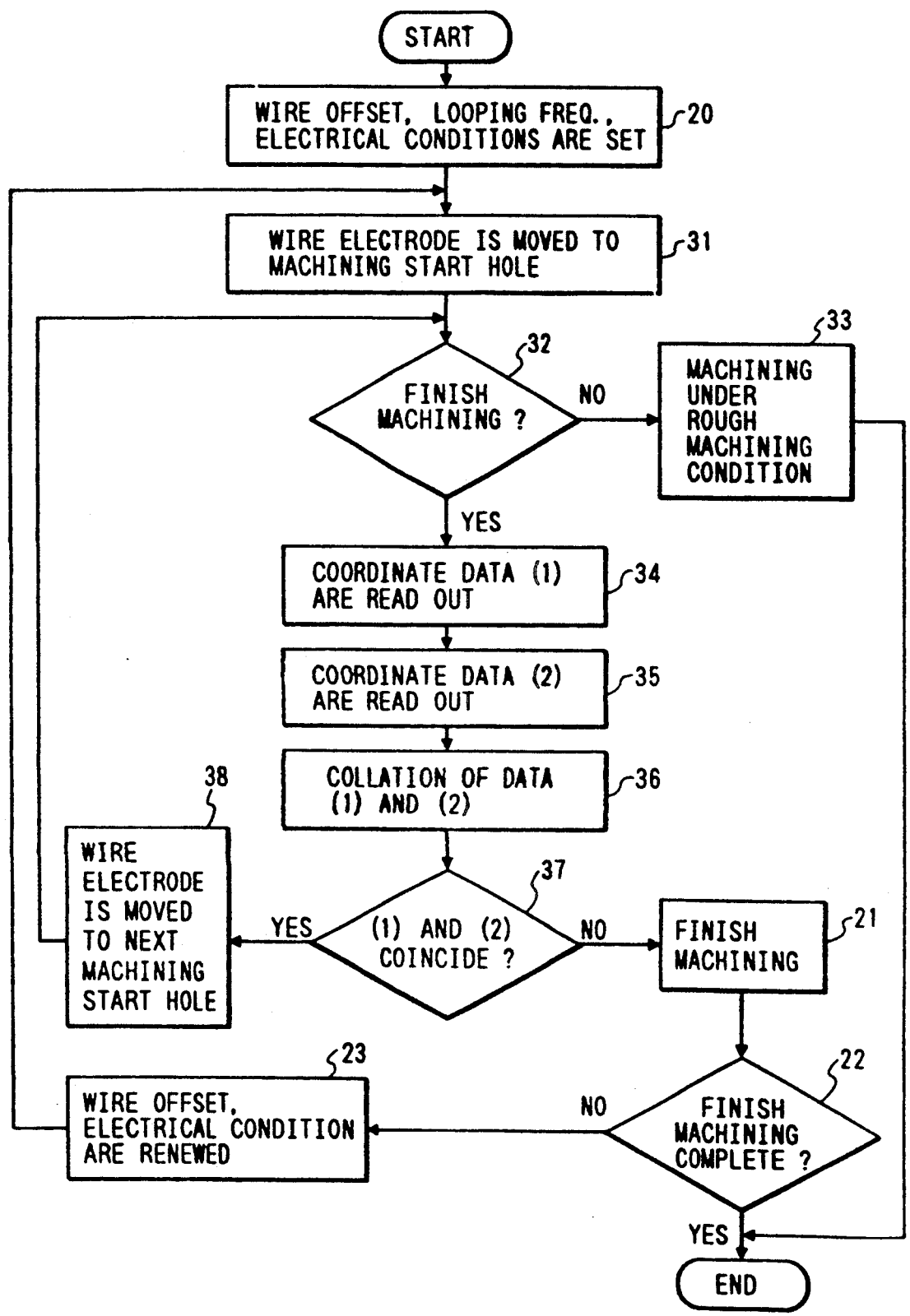
FIG. 2 is a flow chart for a description of the operation of the wire cut type electric discharge machine.
Figure 3:
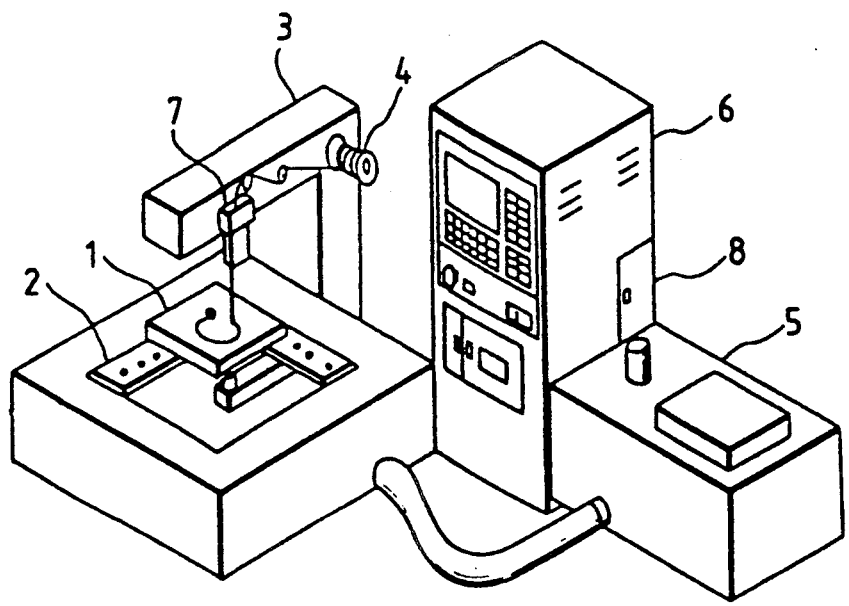
FIG. 3 is a perspective view showing the arrangement of a conventional wire cut type electric discharge machine.
Figure 5:
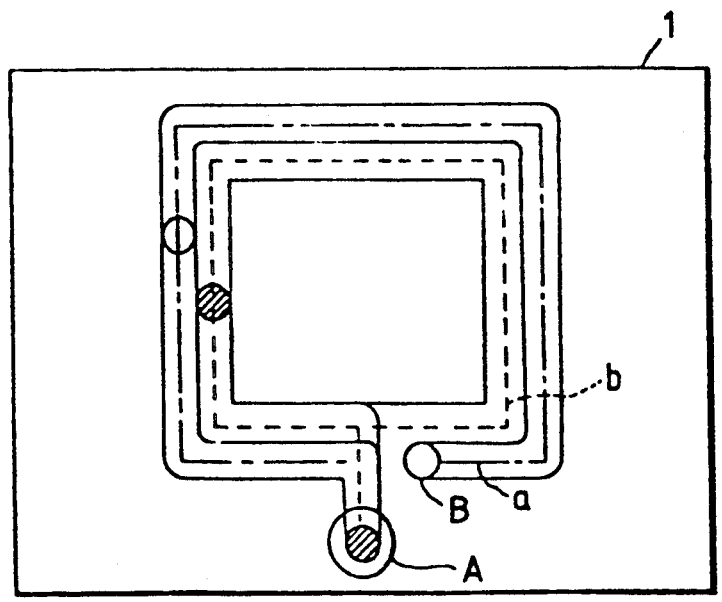
FIG. 5 is an explanatory diagram for a description of a finish machining operation.
Figure 6:
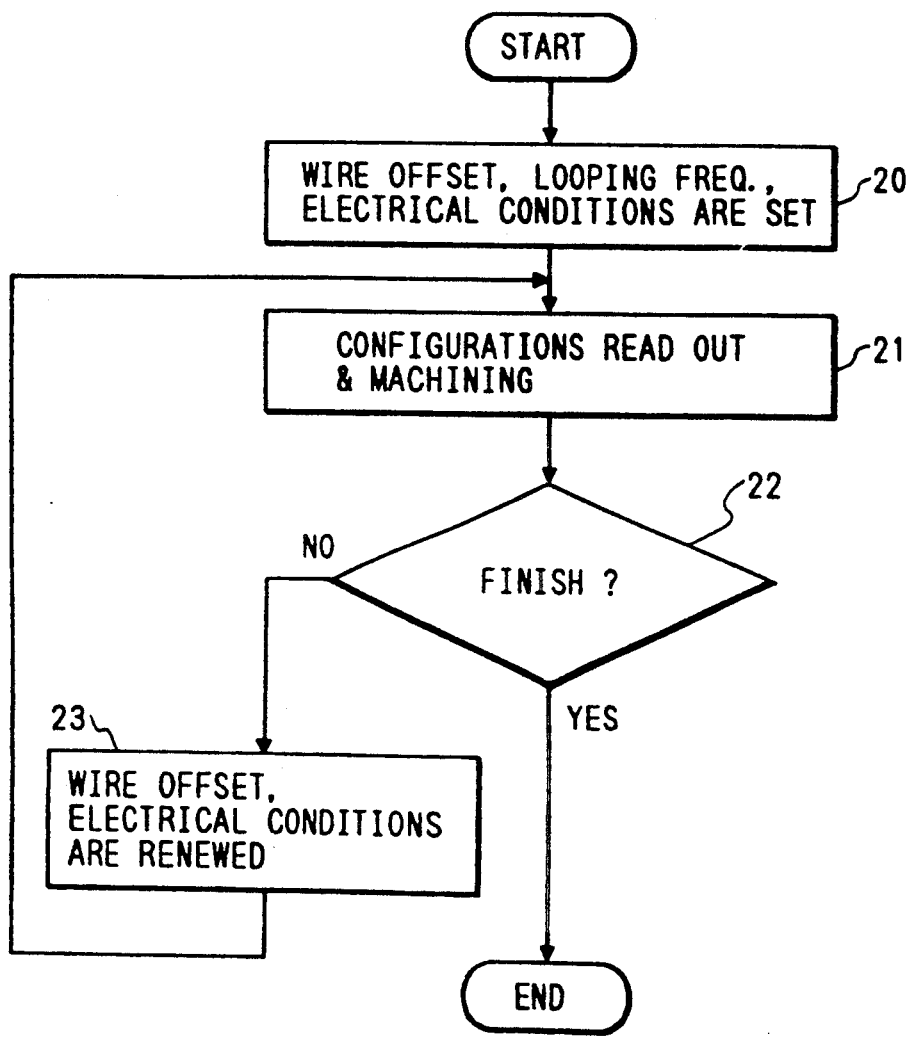
FIG. 6 is a flow chart for a description of the finish machining operation.

FIG. 2 is a flow chart for a description of the operation of the wire cut type electric discharge machine according to the invention.

The operation of the electric discharge machine will be described. The rough machining process and the machining skip operation are the same as those in the conventional electric discharge machine described before.

Figure 7:
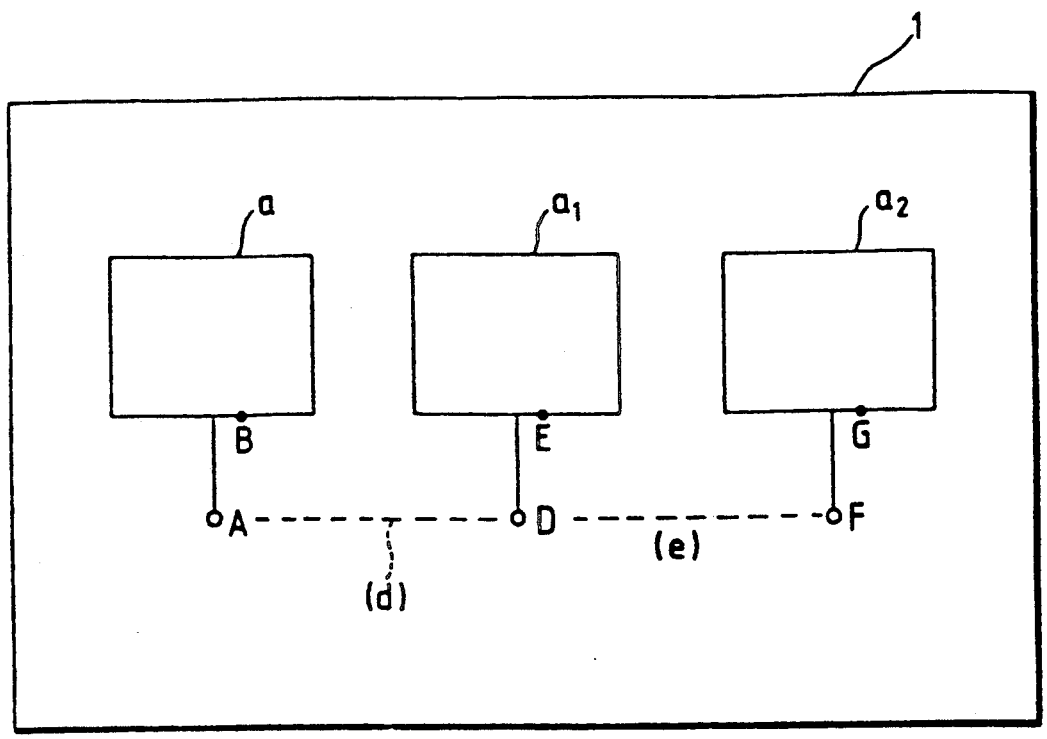
FIG. 7 is an explanatory diagram showing a plurality of finish machining operations given to a workpiece.
Figure 8:
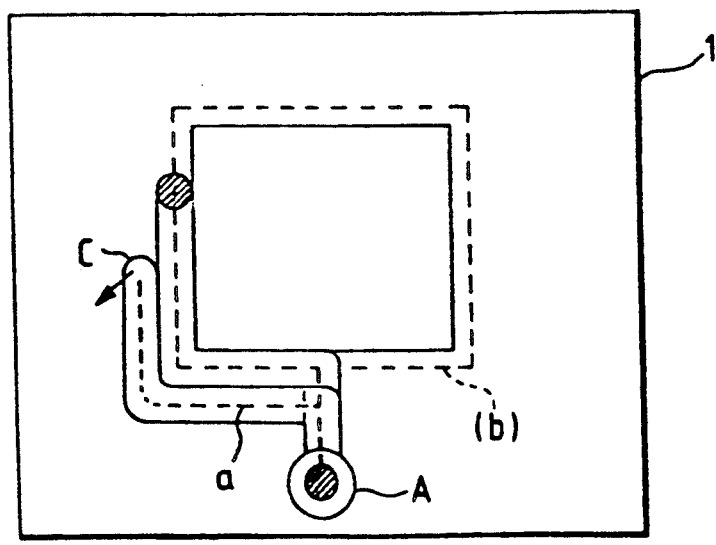
FIG. 8 is an explanatory diagram showing the occurrence of a machining skip.
Figure 9:
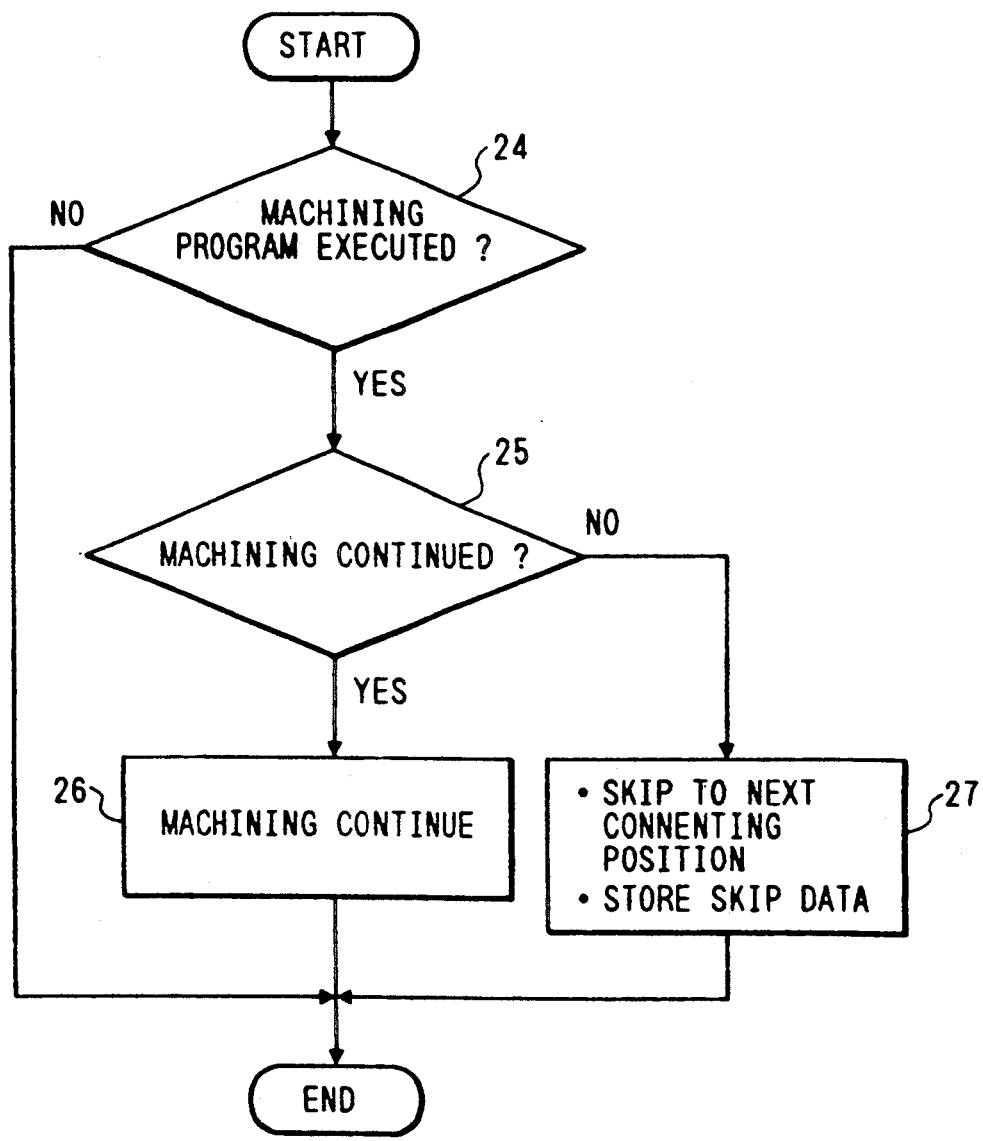
FIG. 9 is a flow chart for a description of a machining skip.

When, similarly as in the prior art, a machining skip occurs with the first configuration machining operation as shown in FIG. 7, the machining start hole coordinates or machining start hole number of the configuration machining operation is stored, as machining start position data, in the machining skip data storing table 19. When, under the above-described conditions, a finish machining operation is carried out after a rough machining operation, then as shown in the flow chart of FIG. 2, in Step 20 the electrical conditions are changed to finishing machining electrical conditions, the amount of offset of the wire electrode 4 with respect to the workpiece 1 is changed, and the number of times of finish machining operations; namely, the looping frequency is set, for instance, to one (1).

Thereafter, in Step 31 the wire electrode 4 is moved to the machining start hole (A) as shown in FIG. 7, and is automatically connected by the automatic wire electrode supplying device 7. Under this condition, in Step 32 the finish machining operation is confirmed, and the process shifts to Step 34.

In Step 34, the machining start position data of machining configuration where the fault is occurred during a rough machining operation are read out from the machining skip data storing table 19, and then in Step 35 the machining start position data of the finish machining operation are read out.

Thereafter, in Step 36, those data thus read out are subjected to collation.

Next, in Step 37, it is determined whether or not the data thus collated are coincided with each other.

In the case where the collation results in non-coincidence, the predetermined machining configuration is read out, and the machining operation is carried out under the machining conditions set in the above-described Step 20. When the finish machining operation is ended, it is determined in Step 22 whether or not the finish machining operation has been accomplished. When it is determined that the finish machining operation has been accomplished, the machining operation is stopped. If not, in Step 23 the amount of offset of the wire electrode 4 and the machining conditions are renewed for the next finish machining operation, and the process returns to Step 31 to perform the above-described operations all over again. When in Step 37 the data are coincided with each other, it means that the rough machining operation of the machining configuration to which a finish machining operation is to be given has been suspended. That is, in Step 38, the wire electrode 4 is moved along the path (d) in FIG. 7 to the machining start hole (D). If the remaining rough machining operation of the machining configuration are free from difficulties, then the finish machining operation will be carried out in the predetermined manner. Thus, all the machining operations will be accomplished.

When a series of machining operations are accomplished in the above-described manner, the finish machining operation is not given to the machining configuration with which the rough machining operation has suffered from difficulties. Therefore, the machined configuration is left with the wire electrode connecting hole, namely, the machining start hole. Therefore, if the operator eliminates the cause for the machining skip, and the finish machining operation is carried out again, then the configuration machined as required can be obtained.

The operation in Step 32 is carried out by the discriminating means 19a, the operations in Steps 34 through 37 are carried out by the collating means 19b, and the operation in Step 38 is carried out by the skip control means 19c.

As was described above, in the invention, data on the machining start position of a configuration machining operation with which a fault has occurred are stored, and in a finish machining operation the machining start position data thus stored are collated with those on the machining start position of the finish machining operation, and when the collation results in non-coincidence, the finish machining operation is carried out, whereas when the collation results in coincidence, the finish machining operation is skipped over to the following finish machining operation so that the finishing of the machining configuration with which a fault has occurred is skipped. Hence, a finish machining operation automatically follows a rough machining operation, and the resultant configuration is high in accuracy and uniform in surface roughness.

What is claimed is:

1. A wire cut type electric discharge machining method in which, when a fault occurs during a configuration machining operation, the configuration machining operation is suspended and skipped over to the next configuration machining operation, said method comprising the steps of:
- a step of storing machining start position data of said configuration machining operation with which said fault has occurred;
- a step of determining whether or not a machining operation is a finish machining operation;
- a step of collating, when said determination results in a finish machining operation, said machining start position data thus stored with machining start position data in said finish machining operation; and
- a step of carrying out said finish machining operation when said collation results in non-coincidence, and skipping said finish machining operation over to the following finish machining operation when said collation results in coincidence.

2. A wire cut type electric discharge machine in which, when a fault occurs during a configuration machining operation, the configuration machining operation is suspended and skipped over to the next configuration machining operation, said apparatus comprising:
- memory means for storing machining start position data of said configuration machining operation with which said fault has occurred;
- discriminating means for determining whether or not a finish machining operation is effected;
- collating means for when said determination results in a finish machining operation, said machining start position data thus stored with machining start position data of said finish machining operation; and
- skip control means for carrying out said finish machining operation when said collation results in non-coincidence, and skipping said finish machining operation over to the following finish machining operation when said collation results in coincidence.

* * * * *